United States Patent [19]

Klann

[11] 4,219,918
[45] Sep. 2, 1980

[54] COMPRESSION SPRING CRAMP

[76] Inventor: Horst Klann, Terra Wohnpark 11, 7730 VS-Villingen 24, Fed. Rep. of Germany

[21] Appl. No.: 18,901

[22] Filed: Mar. 9, 1979

[30] Foreign Application Priority Data

Mar. 28, 1978 [DE] Fed. Rep. of Germany ....... 2813381

[51] Int. Cl.² ........................................... B23P 19/04
[52] U.S. Cl. .................................... 29/227; 254/10.5
[58] Field of Search .................. 29/227; 254/10.5, 67; 269/244

[56] References Cited

U.S. PATENT DOCUMENTS

| 2,043,140 | 6/1936 | Wilmesherr | 269/244 |
| 3,067,500 | 12/1962 | Bliss | 29/227 |
| 3,256,594 | 6/1966 | Howard et al. | 254/10.5 |
| 3,747,895 | 7/1973 | Martin | 254/10.5 |

*Primary Examiner*—James L. Jones, Jr.
*Attorney, Agent, or Firm*—McGlew and Tuttle

[57] ABSTRACT

A compression spring cramp for large helical or coil springs, particularly, axle springs of motor vehicles, comprises, a hollow guide tube with a threaded spindle rotatably mounted in the guide tube. A first spring gripper member has an inner portion secured to the hollow guide tube adjacent the top thereof and has a substantially semi-cylindrical spring engaging channel portion which extends outwardly from the inner portion and has a channel opening extending downwardly so as to be engageable over the coil of the spring. A second gripper has an inner slider portion which is threadedly engaged on the threaded spindle for movement upwardly and downwardly on the guide tube and includes an outer portion with a substantially cylindrical spring engaging channel portion extending outwardly from the slider portion exteriorally of the guide tube and opening upwardly to engage below a coil of the spring. The spindle is rotatable such as by an attached or separately supplied tool which may, for example, comprise a wrench engageable with a hexagonal or squared nut end of the spindle which extends outwardly of the guide tube or by a fluid pressure driven rotor which is incorporated as an extension of the guide tube and which includes a rotor connectable to the spindle which is driven by fluid pressure such as compressed air.

11 Claims, 9 Drawing Figures

COMPRESSION SPRING CRAMP

FIELD AND BACKGROUND OF THE INVENTION

This invention relates to devices for handling large springs in general and, in particular, to a new and useful compression spring cramp for engaging and compressing compression springs in installations, such as motor vehicles.

DESCRIPTION OF THE PRIOR ART

Spring cramps are used for the insertion or removal of motor vehicle axle springs and, for this reason, they must be compressed in the axial direction to prevent the parts which they are clamped between or will be clamped between from being exposed to the pressure of the springs during assembly or disassembly. A device of the kind mentioned above is known in which one gripper is secured to the lower end of two pneumatic cylinders which extend in parallel to each other, and the other gripper is secured to a guide casing which is engageable from above over the two parallel cylinders, to be moved toward the lower gripper by means of the piston rods which are axially displaceable within the cylinders by compressed air.

Aside from being very expensive to manufacture, due to the necessary precision parts, the stroke of this device is reduced to only one-half of the overall length thereof. In addition, the device can only be employed where compressed air is available.

SUMMARY OF THE INVENTION

The present invention is directed to a compression spring cramp which is simpler and less expensive to manufacture and is independent of the availability of compressed air, having a working stroke which is not reduced to one-half of its overall length but is, in fact, substantially longer.

In accordance with the invention, there is provided a compression spring cramp for large helical or coil springs, particularly axle springs of motor vehicles. The cramp includes a hollow guide tube with a threaded spindle rotatably mounted in the guide tube, with a first gripper element engaged at the top of the guide tube and having an outwardly extending, substantially semi-cylindrical spring-engaging channel portion which is adapted to engage over a coil of the spring and a second gripper which is provided with an inner slider portion which is threadedly engaged with the spindle so that it moves upwardly and downwardly in the guide tube upon rotation of the spindle and includes an upwardly extending semi-cylindrical spring-engaging channel which is adapted to engage a coil of the spring from beneath.

The guide tube and the sliding part engaged therewith through an internal thread may be relatively simple component parts which are easy to manufacture and can easily be fitted to each other for satisfactory operation, so that the basic condition for a costs-saving production is met. Due to the provision of a spindle as the drive means for the movable gripper and its fixed position within the guide tube, and of an axially movable sliding part, the maximum stroke of the movable gripper is extended to almost the overall length of the guide tube. It is further of primary importance that the guide tube and the sliding part which is guided along the tube wall, i.e., either on the outer surface or the inner surface thereof, confer the static stability necessary for overcoming the sometimes enormous spring power to the device. Instead of a guide tube which is preferably cylindrical, a hollow-section bar, for example, a channel bar, may also be provided as the guide element, in the hollow of which the threaded spindle is mounted and the sliding part meshing therewith is guided. To obtain satisfactory sliding and guiding conditions for the displacement of the sliding part on the guide element, however, a cylindrical guide tube is preferable to a hollow-section bar, since the machining of a cylindrical guide tube is simpler and less expensive as compared to a hollow section.

The slider part advantageously comprises a sleeve member which surrounds and fits the guide tube and is mounted thereon for axial displacement or being secured against rotation. The slider includes an outer sleeve with an inner slider portion which is connected with a close fit and is mounted for axial displacement at the interior of the guide tube and which meshes through a concentric tap hole of the slider with the threaded spindle.

Due to this arrangement, particularly good guide properties are obtained between both the sliding member and the guide tube and between the slider and the guide tube. An adequate axial guidance of the slider is of importance since the threaded spindle, if it is to be kept continually at an optimum of easy motion, particularly under high pressures, must not be exposed to a tilting moment which might result in a jamming in the slider thread.

The slider advantageously comprises two radial fingers which project therefrom in diametrically opposite directions through vertically elongated or axially extending slots of the guide tube. The fingers engage cross-sectionally conformable recesses of the sleeve member.

In this way, both the sleeve part and the slider are secured against rotation relative to the guide tube and a uniform or balanced shearing force distribution relative to the axis of the threaded spindle is ensured with simple means. It is particularly advantageous if the radial fingers and axial slots extend in the axis of symmetry of the grippers passing through the axis of the guide tube since the most favorable leverage conditions are thereby obtained and even the possibility is given to omit the radial finger and the axial slot on the remote side of the guide tube diametrally opposite to the grippers.

The upper gripper which is fixed to the guide tube adjacent its top end is secured to a sleeve member which surrounds and fits the guide tube and is secured against rotation and axial displacement. That is, this makes it possible to machine the guide tube uniformly over its entire length and to fit the sleeve part, which may be of identical design with the movable sleeve member, to the end of the guide tube subsequently.

By providing a sliding ring mounted on the guide tube intermediate between the two grippers and carrying a pivotable hook for the spring, the possibility is given in addition to positively lock one of the compression spring turns located between the grippers, to the guide tube, to prevent a bulging of the spring during the compression. This is particularly important with longer springs to prevent accidents. In prior art devices, such a safety measure cannot be provided.

Accordingly, an object of the invention is to provide a compression spring cramp for large helical or coil springs, particularly for axle springs of a motor vehicle, which comprises, a hollow guide tube, a threaded spindle rotatably mounted in the guide tube, a first gripper having an inner portion secured to the guide tube adjacent the top thereof and having a substantially semi-cylindrical spring-engaging channel portion extending downwardly so as to be engageable over a coil of the spring and further including a second gripper having an inner slider portion threadedly engaged with the spindle so as to be movable upwardly and downwardly in the tube upon rotation of the spindle and having a substantially semi-cylindrical spring-engaging channel portion extending outwardly from the inner slider portion and opening upwardly to engage below a coil of the spring.

A further object of the invention is to provide a compression spring cramp which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
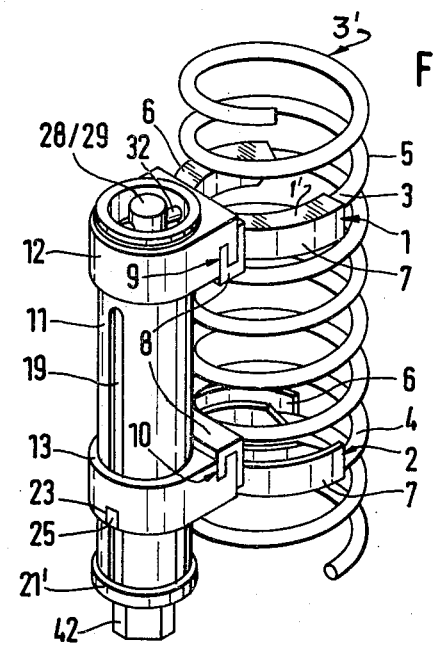
FIG. 1 is a perspective view of a compression spring cramp constructed in accordance with the present invention.
Figure 4:
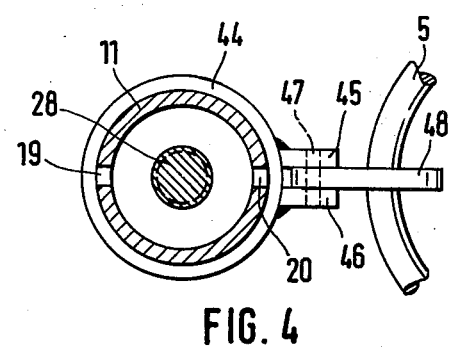
FIG. 4 is a similar view taken along the line IV—IV of FIG. 2.
Figure 3:
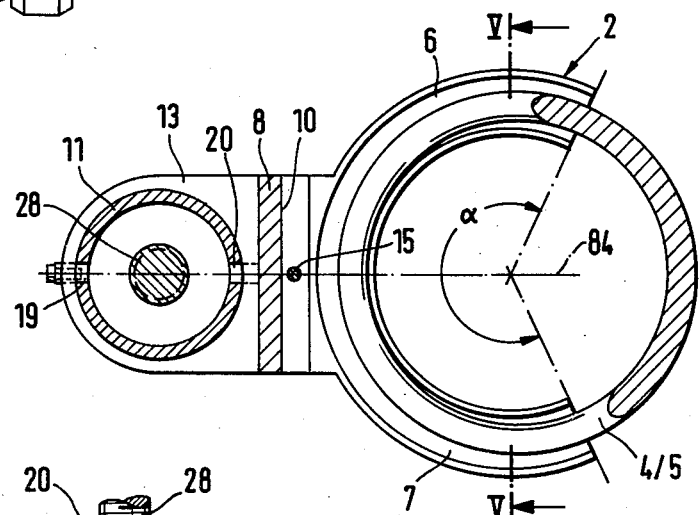
FIG. 3 is a sectional view taken along the line III—III of FIG. 2.

Referring to the drawings in particular, the invention embodied therein in FIGS. 1 through 4, comprises, a compression spring cramp for large helical or coil springs, in particular, axle springs of motor vehicles, which includes a hollow guide tube 11 in which a threaded spindle 28 is rotatably mounted. A first or upper gripper member 1 has an inner portion or sleeve 12 which is secured to the guide tube 11 adjacent the top thereof. The gripper 1 also has an outer portion 1' connected to the inner portion 12 which comprises a substantially semi-cylindrical spring-engaging channel which opens downwardly so as to be engageable over a coil 3 of a coil spring, generally designated 3'. The device also includes a second gripper having an inner slider portion 26 which is threadedly engaged on the threaded spindle 28 and which is guided within tube 11 for movement upwardly and downwardly upon rotation of spindle 28. The second gripper includes an outer portion with a substantially semi-cylindrical spring-engaging channel which extends outwardly from the inner portion and is opened upwardly so as to engage below a coil 4 of the spring 3'.

Figure 5:
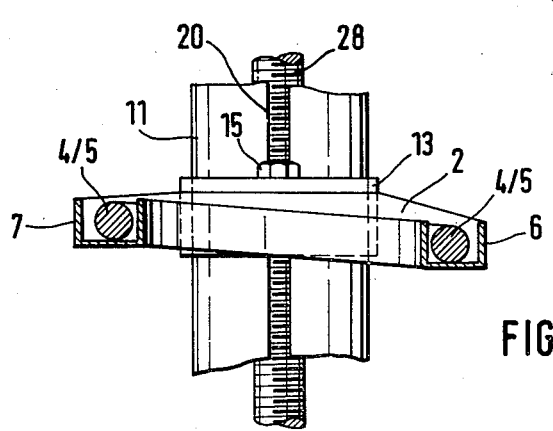
FIG. 5 is a sectional view taken along the line V—V of FIG. 3.

The compression spring cramp shown in the drawings comprises two horseshoe-shaped or semi-cylindrically shaped grippers 1 and 2 which are mounted in symmetrical and thus congruent arrangement relative to each other and each of which substantially comprises a circularly bent channel section in which a turn 3 or 4 of a helical compression spring 5 can be received with radial play. The grippers are positioned so that the open sides of their channel sections face each other. The grippers are made conformable to the inclined extension of the turns of the spring to be clamped, so that one arm 6 of the gripper extends obliquely downwardly and the other arm 7 extends obliquely downwardly, relative to the axial direction of the spring (see FIG. 5). The two arms 6 and 7 of the gripper extend through a central angle α of about 230°. Both of the grippers 1 and 2 are substantially of identical shape and are provided with a transversely extending Z-section bracket 8 by which they positively engage a fitting transverse groove 9 or 10 of a sleeve member 12 or 13 which is mounted on a guide tube 11.

The gripper and sleeve member parts are held in as assembled state by means of respective bolts 14 and 15. Sleeve member 12 is fixed to the upper end of a guide tube 20 and is secured against rotation by means of a slotted portion 16 of the guide tube, and against axial displacement by means of two lock washers 17 and 18 resiliently received in radial grooves. The guide tube 11 is provided with two diametrally opposite axial slots 19 and 20 which extend from a location beneath the upper sleeve member 12 down to the bottom edge 21 of the guide tube, which means that they are open at the lower end of guide tube 11.

Sleeve member 13 is axially displaceable on guide tube 11 and is mounted thereon for easy sliding motion and is provided, in the zone of the two axial slots 19 and 20 of guide tube 11, with appropriately wide recesses 22 or 23 receiving radial fingers 24, 25 of a slider 26, which have a conformable cross-section and extend through axial slots 19 and 20.

Figure 2:
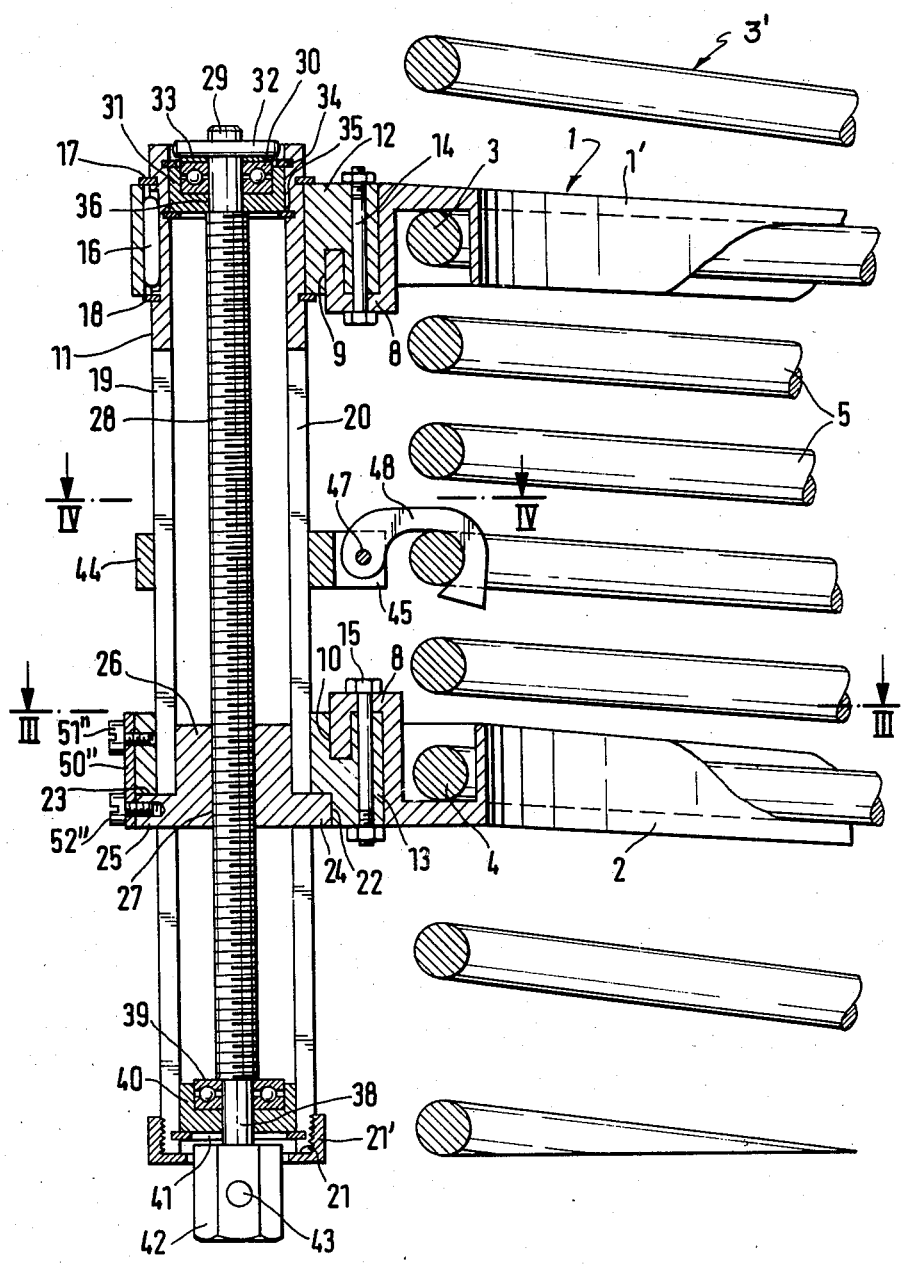
FIG. 2 is a sectional view of the cramp shown in FIG. 1.
Figure 6:
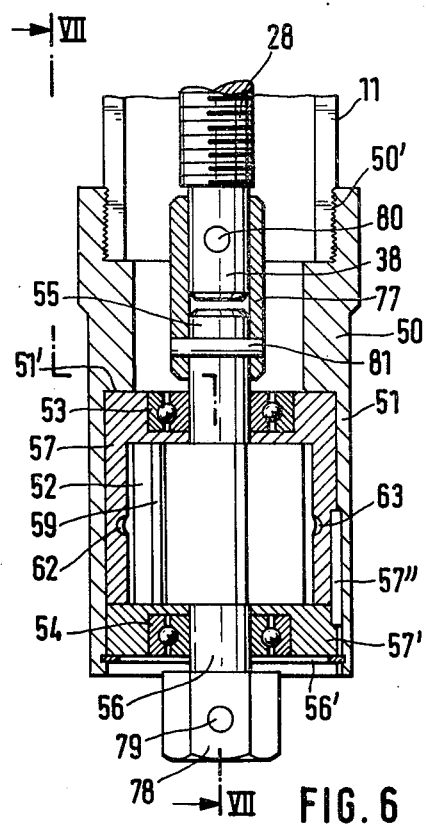
FIG. 6 is a sectional view of a pneumatic mechanism for driving the compression spring cramp.
Figure 7:
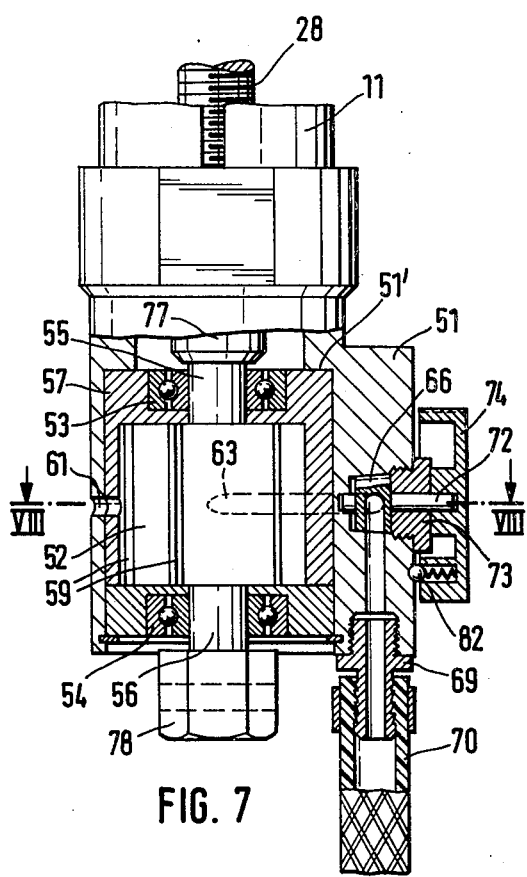
FIG. 7 is a partial sectional view taken along the line VII—VII of FIG. 6.
Figure 8:
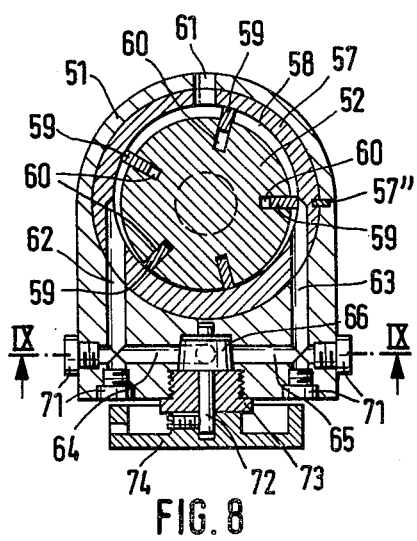
FIG. 8 is a similar view taken along the line VIII—VIII of FIG. 7.
Figure 9:
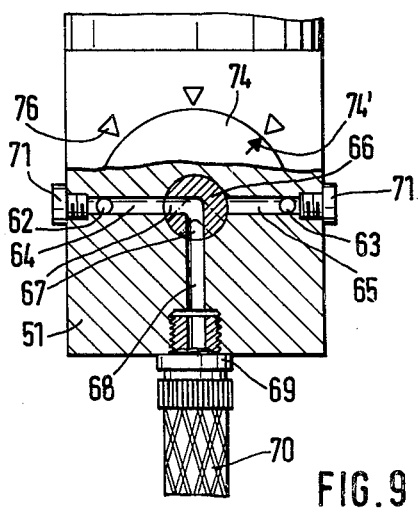
FIG. 9 is a partial sectional view taken along the line IX—IX of FIG. 8.

As may be learned from FIG. 2, recesses 22 and 23 are provided on the underside, or on the side remote from gripper 2 of sleeve member 13, so that, under the pressure of the spring, sleeve member 13 will be braced by radial fingers 24, 25. A locking connection is thus established between slider 26 and sleeve member 13 permitting an easy sliding displacement of both parts on guide tube 11, but preventing a rotary motion of sleeve member 13 about the guide tube, because of the radial fingers 24, 25 guided in axial slots 19, 20.

Slider 26 is provided with a central threaded taphole 27 through which it meshes with a threaded spindle 28 centrally extending in guide tube 11. Spindle 28 is provided with a cylindrical extension 29 on its upper end which is passed through a thrust bearing 30 received in a bearing sleeve 31. Threaded spindle 28 is supported on thrust bearing 30 by means of a cross-pin 32 and an underlying bearing plate 33. Bearing sleeve 31 is fixed in guide tube 11 by means of radially springing lock washers 34 and 35. The central bore 36 of the sleeve 31 has a diameter fitting the smaller diameter of cylindrical extension 29 of spindle 28, so that the spindle 28 is secured, with some play, against axial displacement in both directions. The lower end of threaded spindle 28 is also provided with a cylindrical extension 38 of a smaller diameter which is analogously supported in a thrust bearing 39 which, however, might also be designed as a radial bearing.

Thrust bearing 39 is again seated in a bearing sleeve 40 which is of identical design with bearing sleeve 31 and is fixed in the guide tube 11 by means of a spring washer or lock washer 41. The portion of extension 38 projecting from the bottom end of guide tube 11 carries a hexagonal wrench head 42 which is secured thereto by a cross-pin 43. The bottom end of guide tube 11 is provided with a screw cap 21'. A slide ring 44 is mounted intermediate the two sleeve members 12 and 13 for axial displacement and rotation on guide tube 11 and is equipped with a hook 48 for the spring, which is pivotally mounted thereon by means of a pivot pin 47 extending between two parallel sideplates 45, 46. In addition, by means of this hook, the spring 5 to be clamped can be secured against bulging. Sleeve member 13 is firmly screwed to radial finger 25 of slider 26, by means of a cover plate 50" and two screws 51", 52". Instead, the two parts might also be welded to each other.

In order to clamp or compress spring 5, the two grippers 1 and 2, which are brought into a suitable spaced relationship in advance by a corresponding rotation of threaded spindle 28 are each engaged over a certain turn 3, 4 of the spring. By further or opposite rotation of the spindle, the spring turns of compression spring 5 located between the two grippers are then compressed.

It is evident that the maximum working stroke of the lower gripper nearly equals the entire length of the guide tube part extending below the upper gripper.

While in the embodiment of FIGS. 1 to 5 described above, threaded spindle 28 may be rotated manually or by means of a mechanical drive, for example, a pneumatically operated impact wrench, it is also possible to provide a pneumatically operated drive mechanism for spindle 28 such as shown in FIGS. 6 to 9, which can be directly combined with the compression spring cramp, i.e., attached to the guide tube 11.

In a housing block 51 which is provided on its upper side with a tubular extension 50, a blade rotor 52 is mounted, in radial ball bearings 53, 54 and by means of stub shafts 55, 56, for rotation in a cylindrical casing 57 enclosing a cylindrical rotor chamber 58 which is eccentric relative to the axis of the blade rotor 52. The rotor is mounted coaxially of tubular extension 50 and is thus also coaxial with threaded spindle 28 and with guide tube 11 which is screwed by means of a thread 50' into tubular extension 50.

The blade rotor 52 is equipped with a total of five blades 59 which are received in grooves 60 for radial motion under spring action and are in permanent sealing contact with the inside surface of rotor chamber 58. At the location where the sickle-shaped cavity has its widest radial clearance, a radial outlet bore 61 is provided. At an angular distance of about 90° to each side of this outlet bore 61, inlet channels 62 and 63 open into rotor chamber 58 at diametrally opposite locations, extending through housing block 51 and casing 57. These tangential inlet channels 62, 63, in turn, each communicate with a transversely extending channel 64 or 65, respectively, which is connectable, by means of a rotatable valve plug 66 having an angle bore 67, to a vertical channel 68 which communicates, through a nipple 69, with a compressed air supply hose 70. Each of the channels 62, 63, 64 and 65 is sealed to the outside by means of a screw plug 71.

The valve plug is connected by means of a stub shaft 72 mounted in a stuffing box 73 to a rotary knob 74 which may be turned into positions "release" or "off" or "compression". In the position "release" in which the mark 74' of knob 74 is aligned with mark 76, the compressed air supplied through the hose 70 flows through channel 68, angle bore 67, channel 65 and channel 63 into rotor chamber 58 and causes a counterclockwise rotation (as viewed in FIG. 8) of blade rotor 52 and threaded spindle 28. In the position "off" of knob 74 or valve plug 66, the compressed air supply is interrupted. In the position "compression", the lefthand inlet channel 62 is supplied with compressed air, so that blade rotor 52 and spindle 28 rotate clockwise.

To be able, if needed, to actuate the spindle also manually, the lower stub shaft 56 of blade rotor 52 which is coupled to spindle 28 by a collar socket 77, is provided with a hexagon head 78 which is secured by means of a cross-pin 79. Collar socket 77 is pinned, on the one hand, to the cylindrical extension 38 of spindle 28, by means of cross-pins 80, 81 and, on the other hand, to stub shaft 55 of blade rotor 52.

To facilitate the control, rotary knob 74 is provided with a snap-action ball stop 82 which is effective in the marked positions.

The spindle can be driven in one or the other direction, as desired, by means of this pneumatic drive mechanism. The speed of rotation can be controlled by correspondingly positioning valve plug 66, i.e., enlarging or reducing the cross-section for the air flow.

It is to be noted that the axial slots 19 and 20 in which the radial fingers 24, 25 of slider 26 are guided, advantageously extend in the plane of symmetry 84 of the two grippers 1 and 2 passing through the axis of spindle 28. This ensures the best interaction of forces for a quite satisfactory operation, particularly the sliding guidance.

Casing 57 and its bottom 57' are secured against rotation in housing block 51 by means of a sunk key 57" and axially fixed by means of a radially springy lock washer 56' and a radial shoulder 51'.

While specific embodiments of the invention have been shown and described in detail to illustrate the application of the principles of the invention, it will be understood that the invention may be embodied otherwise without departing from such principles.

I claim:

1. A compression spring cramp for large helical or coil springs, particularly axle springs of motor vehicles, comprising, a hollow guide tube, a threaded spindle rotatably mounted in said hollow guide tube, a first gripper having an inner portion secured to said guide tube adjacent the top thereof and having a substantially semi-cylindrical spring-engaging channel portion extending outwardly from said inner portion and opening downwardly so as to be engageable over a coil of the spring, a second gripper having an inner slider portion threadedly engaged on said spindle for upward and downward movement within said guide tube upon rotation of said spindle and having a substantially semi-cylindrical spring-engaging channel portion extending outwardly from said slider portion and exteriorly of said hollow guide tube and opening upwardly to engage below a coil of the spring.

2. A compression spring cramp, as claimed in claim 1, wherein said slider portion comprises a sleeve member which surrounds and fits around said guide tube and an inner portion within said guide tube which is threadedly engaged on said spindle.

3. A compression spring cramp, as claimed in claim 2, wherein said slider portion includes two diametrically opposite radially extending fingers, said guide tube having an axially extending slot on each side through which said fingers extend between said slider portion on the interior of said tube and said sleeve portion on the exterior of said guide tube.

4. A compression spring cramp, as claimed in claim 3, wherein said radial fingers and said axial slots extend in the plane of symmetry of said first and second grippers, which plane passes through the axis of said guide tube.

5. A compression spring cramp, as claimed in claim 1, wherein said first gripper inner portion comprises a sleeve surrounding said guide tube and being secured against rotation and axial displacement relative to said guide tube.

6. A compression spring cramp, as claimed in claim 1, including a slide ring engageable on said guide tube between said first and second grippers, a hook pivotally mounted on said ring and being engageable over a coil of the spring.

7. A compression spring cramp, as claimed in claim 1, including means on said spindle extending out of said guide tube for rotating said spindle.

8. A compression spring cramp, as claimed in claim 1, including a fluid pressure operated rotor mounted on said guide tube connectable to said spindle for rotating said spindle.

9. A compression spring cramp, as claimed in claim 1, wherein said guide tube has an extension portion defining a rotor chamber, a rotor rotatably mounted within said chamber and connected to said spindle and means for introducing a fluid pressure to said rotor to drive said rotor to rotate said spindle.

10. A compression spring cramp, as claimed in claim 1, wherein said spindle has an end with a hexagonal head projecting out of said hollow guide tube which is engageable for rotation of said spindle.

11. A compression spring cramp, as claimed in claim 1, comprising a housing extension connected to said guide tube, a rotor rotatably mounted in said extension and being connected to said spindle for rotating said spindle, said rotor including an internal cylindrical chamber, an eccentric rotatable in said chamber, a plurality of radially extending blades on said rotor being displaceable in radial slots of said rotor and engageable with the interior of said housing and means for introducing compressed air into said rotor to drive said rotor.

* * * * *